United States Patent
Haridas et al.

(10) Patent No.: US 12,526,205 B2
(45) Date of Patent: Jan. 13, 2026

(54) DECENTRALIZED NETWORK DISCOVERY FOR INDUSTRIAL CONTROL SYSTEMS

(71) Applicant: Honeywell International Inc., Charlotte, NC (US)

(72) Inventors: Harshal S. Haridas, Jamison, PA (US); Lonnie Walker, West Chester, PA (US); Doreen West, Dresher, PA (US); Nofal Aamir, Collegeville, PA (US)

(73) Assignee: Honeywell International Inc., Charlotte, NC (US)

( * ) Notice: Subject to any disclaimer, the term of this patent is extended or adjusted under 35 U.S.C. 154(b) by 223 days.

(21) Appl. No.: 18/524,931

(22) Filed: Nov. 30, 2023

(65) Prior Publication Data

US 2024/0414068 A1   Dec. 12, 2024

Related U.S. Application Data

(60) Provisional application No. 63/471,693, filed on Jun. 7, 2023.

(51) Int. Cl.
  *H04L 41/22*   (2022.01)
  *H04L 41/12*   (2022.01)

(52) U.S. Cl.
  CPC .............. *H04L 41/22* (2013.01); *H04L 41/12* (2013.01)

(58) Field of Classification Search
  CPC ......... H04L 41/22; H04L 41/12; Y02D 30/00; G05B 9/03
  See application file for complete search history.

(56) References Cited

U.S. PATENT DOCUMENTS

| | | | |
|---|---|---|---|
| 10,230,567 B2 * | 3/2019 | Tripathi | .................... G06F 8/63 |
| 2015/0304157 A1 * | 10/2015 | Kim | ...................... G06F 3/0481 |
| | | | 709/208 |
| 2023/0283514 A1 * | 9/2023 | Jea | ...................... H04L 41/0654 |
| | | | 709/224 |

FOREIGN PATENT DOCUMENTS

| | | |
|---|---|---|
| CN | 104219113 B | 12/2014 |
| CN | 114389944 A | 4/2022 |
| CN | 115379575 A | 7/2022 |

* cited by examiner

*Primary Examiner* — Phuong H Nguyen
(74) *Attorney, Agent, or Firm* — Paschall & Associates, LLC; James C. Paschall; Anthony Miologos

(57) ABSTRACT

A method and apparatus for discovering and displaying a graphical representation of a plurality of network devices connected to a communication network comprises a control network module coupled to the plurality of network devices. A first component of a control network module captures attribute data from the network devices. A second component of the control network module constructs a switch data table identifying a media access control address for each port of a communication network switch associated with each of the plurality of network devices. The second component uses the attribute data and the switch data table to construct a neighbor data table for the plurality of network devices connected to the communication network. A third component of the control network module uses the neighbor data table to construct a neighboring device table and build the graphical representation of the communication network on a display device.

20 Claims, 10 Drawing Sheets

DECENTRALIZED NETWORK DISCOVERY FOR INDUSTRIAL CONTROL SYSTEMS

CROSS-REFERENCE TO RELATED APPLICATION AND PRIORITY CLAIM

This application claims priority under 35 U.S.C. § 119 (e) to U.S. Provisional Patent Application No. 63/471,693 filed on Jun. 7, 2023. This provisional application is hereby incorporated by reference in its entirety.

TECHNICAL FIELD

This disclosure is directed to industrial control systems. More specifically, it relates to decentralized method and apparatus for discovering and graphically representing network devices in an industrial distributed control system communication network.

BACKGROUND

Industrial process control and automation system deployments across geographies are governed by several factors such as distance, functionality, and environment. A distributed system architecture allows an industrial distributed control system (DCS) to be both scaled out and distributed over long distances. As a result, network equipment that comprise data and control networks between assets of the DCS such as Ethernet switches, routers, node interfaces, gateways, firewalls, and network cabling become key components of the DCS. The various network interconnection components used to connect the assets of the DCS support capabilities for transmitting and receiving data and control signals using various transmission protocols such as for example Ethernet, serial or wireless. Further, the network is interconnected using network cables comprised for example of bundled copper wires or fiber optic wires cables that interconnect the DCS assets and network components in for example in a ring, a star or mesh network topologies or in combinations of wired and wireless networks to achieve the required inter-connectivity between the distributed DCS assets.

Currently known network discovery and graphing solutions used in industry are centralized solutions with dedicated server(s) required in their deployments. The key components of such centralized solutions involve the use of specific set of protocols, such as SNMP (Simple Network Management Protocol) to scan information about connected devices, use of active or passive polling/scan methods to identify connected devices, such as for example, active scan methods that involve use of pings to reach end devices and passive scan methods that collect network data available (MAC addresses for ports) without sending a direct ping request. The network inventory and subsequent graphing of the network to show device connectivity enables several operations required to perform additional network management activities, such as for example, configuration, patching, anomaly detection, and monitoring.

A central architecture solution for data sharing and retrieval poses several issues due to the centralized nature of its deployment. For example, it exhibits a single point of failure and as result requires the need for redundant partners or remote backups, restores and migrations. It allows for limited scalability and has increased security risks due to the single central architecture. Finally, the central architecture increases maintenance costs as the deployment nodes are external to the discovered and graphed networks. Because of the issues described above for central architectures, the network discovery solutions are not introduced within industrial control systems at layers where supervisory and critical communication is operational, for example, at levels 0, 1, and 2 of a Purdue model for industrial control systems. The result of including them at a supervisory control layer such as level 3 in the Purdue model is a significant drop in accuracy of network management functions at supervisory levels and (I/O) input/output communications.

Therefore, it is an object of the present disclosure to provide a decentralized network discovery method for discovering connected devices in an industrial control network and to develop graphical representations of the discovered network devices and nodes.

SUMMARY

This disclosure relates to a decentralized network discovery and graphing method for an industrial distributed control system communication network.

In a first embodiment a method is disclosed for identifying and displaying a representation of the network devices connected to a communication network is disclosed. The method comprises capturing, using a discovery protocol, attribute data of the network devices connected to the communication network. A neighbor data table is next compiled for the network devices connected on the communication network using the attribute data captured by the discovery protocol and information from a communication network switch. Using the neighbor data table, a neighboring device table is then built that lists the network devices connected to the communication network. A graphing application uses the neighboring device table to construct a graphical representation of the communication network on a display.

In a second embodiment an apparatus is disclosed for discovering and displaying a graphical representation of a plurality of network devices connected to a communication network on display device. The apparatus comprises a control network module communicatively coupled to the plurality of network devices. A first component executed by a control component of the control network module is arranged to capture attribute data of the plurality of network devices. A second component executed by the control component of the control network module is arranged to construct a switch data table identifying a media access control (MAC) address for each port of a communication network switch associated with each of the plurality of network devices. The second component uses the attribute data and the switch data table to construct a neighbor data table for the plurality of network devices connected to the communication network. A third component executed by the control component of the control network module is arranged to use the neighbor data table to construct a neighboring device table that is arranged to build the graphical representation of the communication network on the display device.

In a third embodiment a decentralized method for discovering and graphically representing network devices connected in a plurality of network nodes in a communication network is disclosed, wherein each node of the plurality of network nodes includes a control network module. The method comprises capturing by the control network module of each network node, using a link layer discovery protocol (LLDP), attribute data of the network devices connected to the network node and associated with the control network module. The method next constructs a switch data table that identifies a media access control (MAC) address for each port of a communication network switch that is associated with each network device and the control network module for each network node. The control network module of each network node builds a neighbor data table for each network device connected to each network node using the attribute data captured by the LLDP and the switch data table and using the neighbor data table to develops a neighboring device table containing the network devices connected to each control network module of each network node. Next at least one control network module using its own list of neighboring device table requests the neighboring device table associated with the control network module of another of the plurality of network nodes, wherein the requesting control network module updates its neighboring device table with the network devices of the another network node. The requesting control network module uses a graphing application and the neighboring device table to construct a graphical representation of the plurality of network nodes and the network devices connected to the network nodes on a display.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

The figures discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Industrial automation is an important feature of today's industrial processing plants. There is a need for industrial process control and automation systems to continually provide greater flexibility in the implantation and operation of the industrial automation systems. In particular in complex DCS deployments network interconnections between the various assets and components of the DCS become problematic, for example, the considerable number of unmanaged Ethernet switch SKUs increases complexity and does not provide for loop detection due to the lack of spanning tree detection methods.

Figure 1:
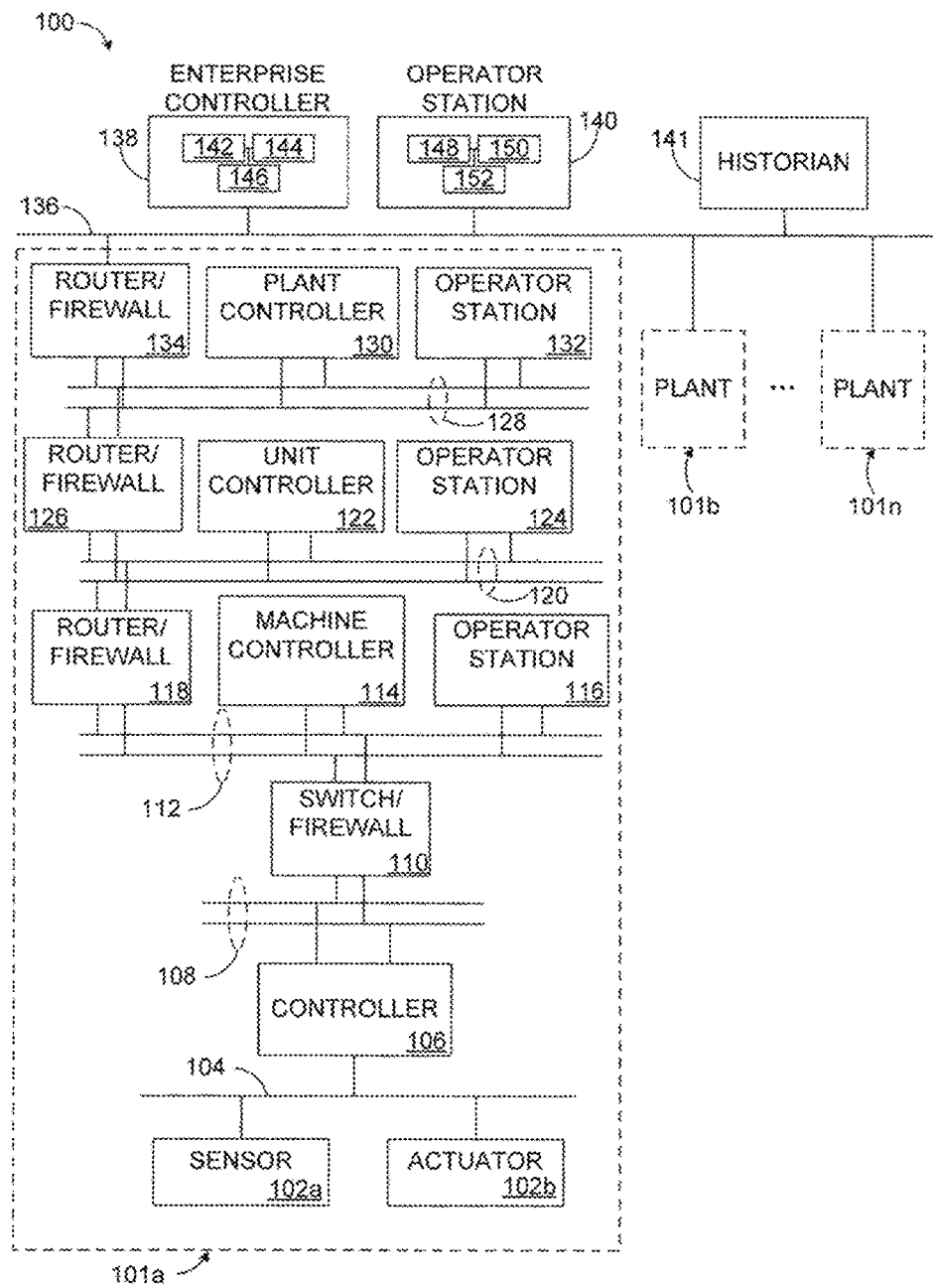
FIG. 1 illustrates an exemplary industrial process control and automation system.

FIG. 1 illustrates an example centralized DCS 100. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system. The sensors and actuators may be referred to as field devices or process instruments.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical serial network (such as a HART or FOUNDATION FIELDBUS network), a pneumatic control signal network, or any other or additional type(s) of network(s).

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. Multiple controllers 106 could also operate in redundant configurations, such as when one controller 106 operates as a primary controller while another controller 106 operates as a backup controller (which synchronizes with the primary controller and can take over for the primary controller in the event of a fault with the primary controller). Each controller 106 includes any suitable structure for interacting with one or more sensors 102a and controlling one or more actuators 102b.

Two networks 108 are coupled to the controllers 106. The networks 108 facilitate interaction with the controllers 106, such as by transporting data to and from the controllers 106. Network 108 could represent any suitable network or combination of networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 includes any suitable structure for providing communication between networks. The networks 112 could represent any suitable networks, such as a pair of Ethernet networks or an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). Each of the machine-level controllers 114 includes any suitable structure for providing access to, control of or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as a pair of Ethernet networks or an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components at the lower levels.

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 121 couples the networks 120 to two networks 128. The router/firewall 121 includes any suitable structure for providing communication between networks, such as a secure router or combination router/firewall. The networks 128 could represent any suitable networks, such as a pair of Ethernet networks or an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components at the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning, and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

Various levels of the Purdue model can include other components, such as one or more databases. The database(s) associated with each level could store any suitable information associated with that level or one or more other levels of the system 100. For example, a historian 141 can be coupled to the network 136. The historian 141 could represent a component that stores various information about the system 100. The historian 141 could, for instance, store information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in separate locations in the system 100. In particular embodiments, the various controllers and operator stations in FIG. 1 may represent computing devices. For example, each of the controllers could include one or more processing devices 142 and one or more memories 144 for storing Instructions and data used, generated, or collected by the processing device(s) 142.

Each of the controllers could also include at least one network interface 146, such as one or more Ethernet interfaces and Ethernet switches or wireless transceivers and routers. Also, each of the operator stations could include one or more processing devices 148 and one or more memories 150 for storing instructions and data used, generated, or collected by the processing device(s) 148. Each of the operator stations could also include at least one network interface 152, such as one or more Ethernet interfaces and or Ethernet switches or wireless transceivers.

Figure 2:
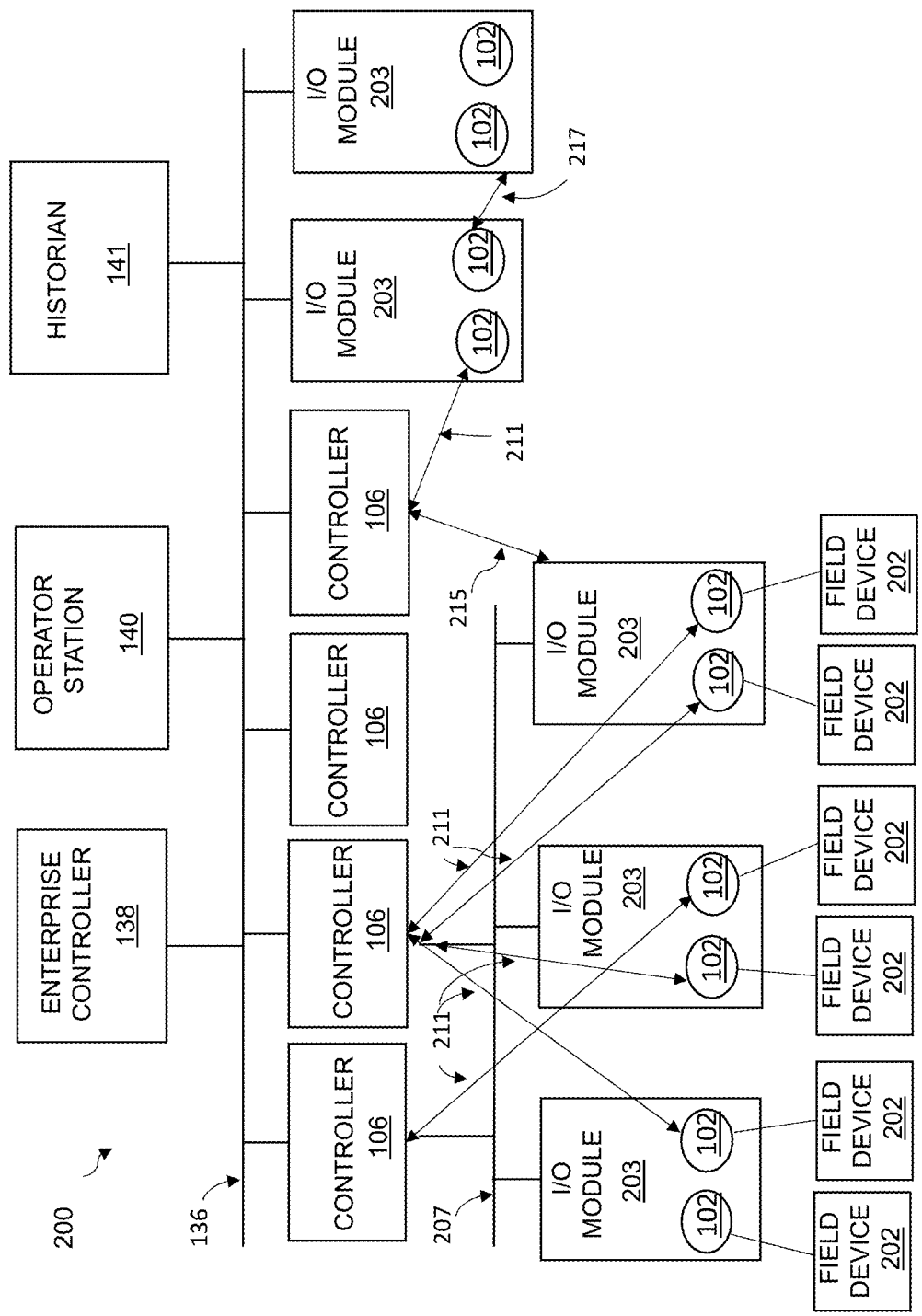
FIG. 2 illustrates an exemplary control node using mesh topology at the channel level of the I/O modules.

In some DCS deployments, a mesh topology may be employed at the channel level of the I/O modules. An exemplary mesh topology at the channel level of the I/O modules is shown in FIG. 2. Enterprise controller 138, operator station 140, historian 141, network 136, and controllers 106 are as described above with reference to FIG. 1. I/O modules 203 have multiple channels 102 which are connected to field devices 102a and 102b of FIG. 1. For simplicity, in FIG. 2, I/O interfaces are not shown as separate from the I/O modules but shown as a unit. An I/O network 207 is shown in addition to network 136. I/O network 207 is a private network. A number of controllers 203 are connected to I/O network 207, while other controllers 203 are connected to network 136.

Typically, field devices allow for monitoring manufacturing processes, such as physical attributes, such as temperatures, pressures, flows, etc., as well as providing control over a process, such as opening/closing valves, increasing/relieving pressures, turning up/down heating or cooling units, etc. There is a need to centralize control and information gathering to improve plant efficiency. Each process in the plant has one or more input characteristics, i.e., control features, and one or more output characteristics, i.e., process conditions.

An automation system that uses a DCS has its system of sensors, controllers and associated computers distributed throughout an industrial plant. DCS systems use methods such as publish/subscribe and request/response to move data from controllers to client servers and applications at a supervisory level. The DCS provides automated decisions based on processing the data in real time or as modified by users in response to analysis of data collected from running processes.

In DCS systems, each controller may be assigned to a specific input/output module and the set of channels and field devices associated with the specific input/output module. Sets of channels and associated field devices are fixed by the I/O module's type, the physical location of the I/O module, or the network location of the I/O module. Flexibility is therefore limited. However, in current mesh topology networks the relationship between one controller and a set of I/O channels is no longer a bound relationship of one controller to a specific set of I/O channels defined by one I/O module, but instead shows the I/O channels of multiple I/O modules to be meshed to a set of control nodes, i.e., controllers.

The I/O electronics have been decoupled from one specific controller. Specifically, FIG. 2 shows the I/O modules each having a plurality of channels at a channel level of the I/O module, where the channels of all the I/O modules are connected in a mesh topology. In FIG. 2, not only have the I/O electronics been decoupled from one specific controller, but with the mesh topology at the channel level of the I/O modules, multiple controllers may be related to a single I/O module and the channels within. Each of the multiple of controllers may be connected to one or more channels of a single I/O module.

The I/O mesh is particularly valuable for engineering efficiency when Universal I/O Modules available from Honeywell Process Solutions are employed. Using technology such as that of the Universal I/O Modules, channel types are software configured. The types available to choose from include analog input, analog output, digital input, and digital output.

Multiple advantages are achieved by employing a mesh topology to the channels of the I/O modules. I/O modules may be located geographically close to the field devices without regard to which specific controller will use those I/O signals and equipment. This advantage supports the current need to simplify designs by removing field junction boxes and deploying more I/O in the field as compared to traditional Control Center and remote instrument enclosure (RIE) deployments.

Another advantage is the ability to use standard Ethernet as a remote medium, including switched and ring topologies. Employing standard Ethernet technology may allow for greater flexibility, greater stability and reliability, greater security, and greater scalability. Further Ethernet connections provide for higher security at the I/O level and is ISA99 certified. However, the disclosure is not limited to Ethernet technology.

At a high-level view, FIG. 2 comprises a system 200 that includes a plurality of I/O modules 203 wherein each I/O module is connected to a plurality of field devices 202 though channels 102 of the I/O modules 203. A channel provides one datum of an industrial process. Process data from field devices or process control strategy instructions to field devices are referred to herein as channels. Channels 102 are configured in a mesh topology. FIG. 2 shows representative field devices 202 connected through channels 102 to a plurality of field devices 202. Hundreds of field devices 202 may be connected to I/O module 203 through channels 102. Field devices 202, are devices for generating process information, or for actuating process units through control of valves, regulators, or other processing devices. Exemplary field devices 202 can be sensors, actuators, or other processing devices, such as valves, flow controllers and other equipment. The mesh topology allows for signals to and from the channels, and therefore to and from the field devices, to reach a necessary controller regardless of the I/O module a channel is associated with. Multiple controllers may be controlling outputs of different channels that belong to the same I/O module. Similarly, Multiple controllers may be controlling inputs of different channels that belong to the same I/O module. Connections may be though, for example, Ethernet technology or wireless technology.

System 200 further includes a plurality of controllers 106. Each controller 106 is configured to receive signals from and transmit signals to any one of the plurality of channels 102 within the plurality of I/O modules 203, wherein the channels 102 are connected in a mesh topology. Just as each channel 102 represents a datum of a process, that datum is destined for a specific controller 106. With the channels 102 configured in a mesh topology, the specific datum in a specific channel can be connected to the proper specific controller 106 regardless of which I/O module the channel resides in. In other words, data collected from field devices via channels is available to any controller though the mesh topology of the channels. Similarly, signals or instructions from the controller may be available to any channel though the mesh topology of the channels.

Each controller 106 generates an information stream for further processing. In some embodiments the controllers 106 may be arranged with electronic interconnection topologies, such as through Ethernet technology. Suitable topologies include, but are not limited to, a ring topology and a star topology. The ring topology comprises an interconnection of the controllers wherein each controller is in communication with two other controllers. A star topology is wherein one or more controllers are interconnected with the remaining controllers. When employing these topologies, it is not required for each controller to be interconnected to all other controllers. In one embodiment each controller is connected to at least one or two other controllers. Using controller topologies such as these, controllers can also share information between each other. Exemplary controllers include an application control system, a field device manager, a remote terminal unit, embedded controllers, programmable logic controllers, virtual nodes, or another device for receiving information and sending instructions to a field device 202. The controller 106 can be operated through a human machine interface, or through a pre-programmed automated system.

System 200 further includes a network 136, which can be a supervisory control network, for directing information streams to and from the controllers 106. Network 136 receives the information stream from the controllers 106 and transmits control strategy information to the controllers 106. When a requesting node needs a datum from a responding node, it issues a request for the datum across the network and the responding node then returns the datum back across the network. Network 136 as a supervisory control network comprises a supervisory control computer and interfacing hardware to enable communication and control between a client server and the industrial plant.

System 200 can further include a data center housing enterprise controller 138, operator station 140, and/or historian 141 for receiving and storing the information stream from the network 136. Sorted data can be retrieved later for analysis. Data storage can be a local storage, a remote storage, or a cloud storage.

With the mesh topology of the channels of the I/O modules, FIG. 2 shows connections between controllers 106 and the channels 102 of I/O modules 203 may occur in multiple separate ways. For example, connections 211 show controllers 106 connected to different channels 102 of different I/O modules 203. One controller 106 may be connected to multiple channels 102 within the same I/O module 203. I/O modules interface I/O to the system over a network. The network may be, for example, a supervisory network or a private I/O network. A controller connected to network 136 may be connected to a channel 102 of an I/O module also connected to network 136. A controller connected to network 136 may be connected to a channel 102 of an I/O module connected to I/O network 207 via connection 215.

Large Ethernet deployments can require a large number of managed Ethernet switch configurations, particularly in DCS systems employing Fault Tolerant Ethernet (FTE) redundant network configurations. For example, in a DCS systems employing 150 FTE nodes, 8 pairs of Ethernet switches using 330 ports would be needed to interconnect the 150 FTE nodes. This includes an FTE network composed of 165 primary and 165 secondary switched pairs. Additionally, it is common in industrial plants to have several pairs of Ethernet or fiber cabling between 100 meters to 10 kilometers in length used in the interconnection of the various nodes of the DCS. This interconnection burden in plant equipment such as unmanaged network switches and cabling becomes even greater in mesh topology networks where the relationship between one controller and a set of I/O channels is no longer a bound relationship of one controller to a specific set of I/O channels defined by one I/O module, but instead shows the I/O channels of multiple I/O modules to be meshed to a set of control nodes, i.e., controllers.

Figure 3:
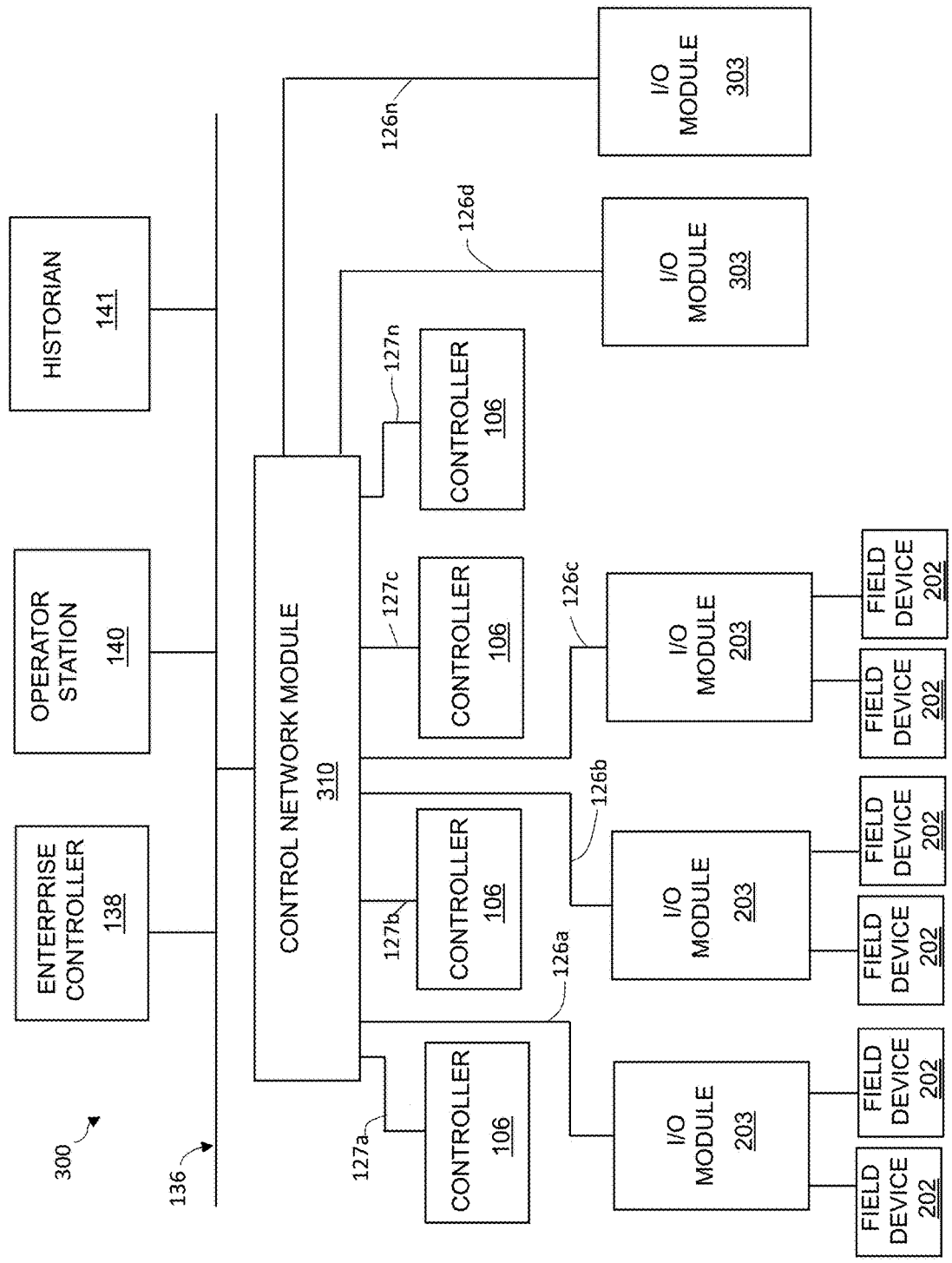
FIG. 3 illustrates the exemplary control node of FIG. 2 using a modular control network node.

FIG. 3 illustrates schematically a modular system architecture that helps achieve several functions while reducing complexity during DCS network deployments. The Ethernet network 207 of FIG. 2 has been replaced by a control network module (CNM) 310 that includes several key architectural building blocks. These include built-in security, including signed firmware and deep packet inspection protocols. A common platform configuration architecture operates a connectivity component that can configure and operate a plurality of wired or fiber network ports for the interconnection to devices and I/O modules and to supervisory networks. A mode selection feature allows a user to select default network port configurations based on the application of the control node. A built-in hardware Ethernet switch provides an expansion capability to provide network connectivity to other controllers or expansion to other control nodes. The CNM 310 also includes a configuration component that allows a user to easily access and configure new network port functions and easily introduce the new connection functions into the network serviced by the control network module.

The CNM 310 can be configured as single I/O termination assembly (IOTA) module or interconnected with another CNM 310 via a backplane of an equipment cabinet or frame or connected together using a data and a control cable to provide an active system IOTA that can easily interconnect multiple controllers 106 or I/O modules 203. The CNM 310 can also be interconnected in other multiple configurations, such as for example active-passive system (IOTA) deployment shown in FIG. 6 and an active-active system independent (IOTA) deployment as shown in FIG. 7. These various deployments will be explained in more detail below.

Figure 4:
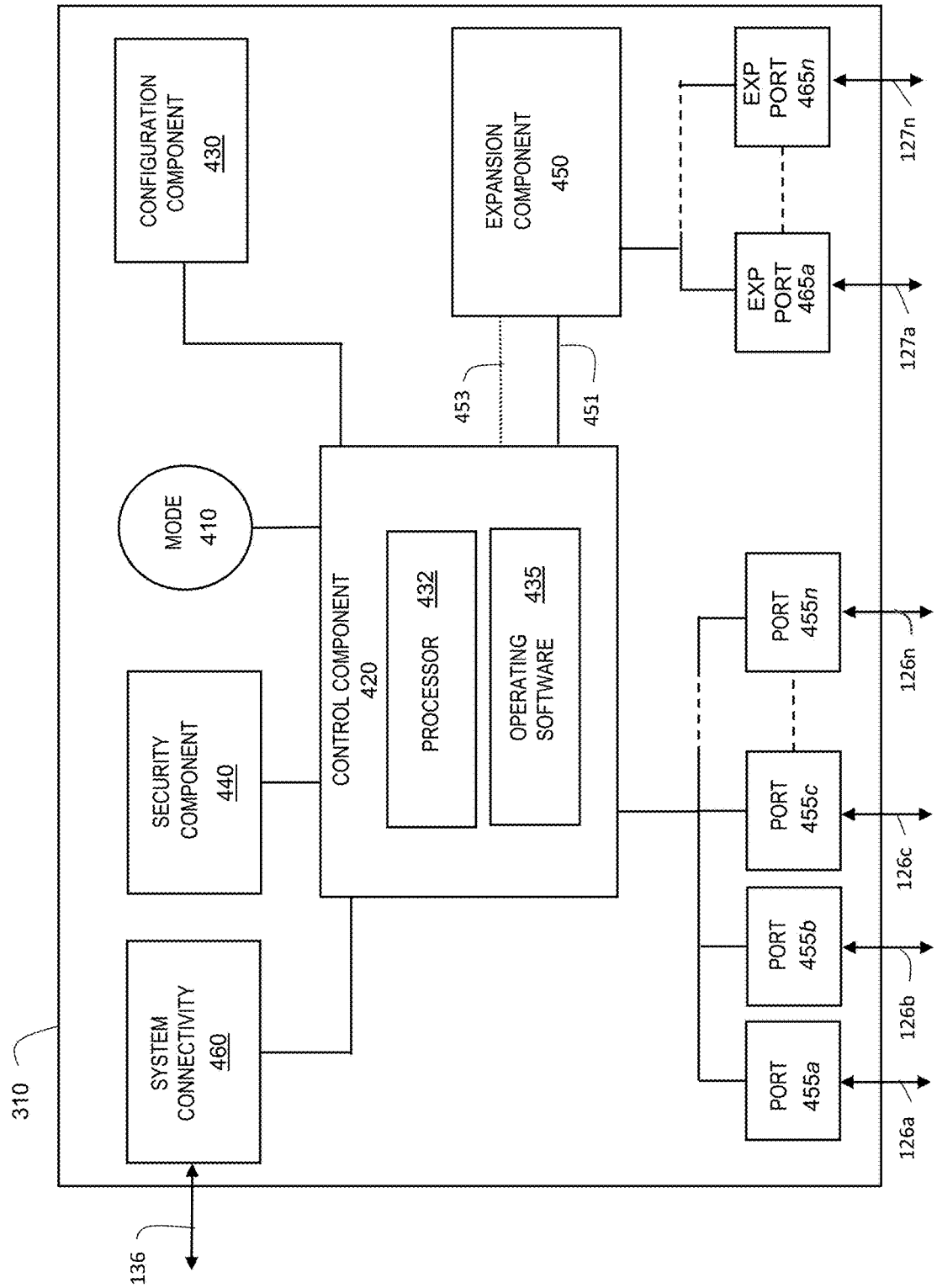
FIG. 4 illustrates schematically the control network module (CNM)

FIG. 4 illustrates schematically the components of the CNM 310. The CNM 310 includes a mode component 410, a control component 420, a configuration component 430, a security component 440, an expansion component 450 connected to a plurality of expansion ports 465a-n, a system connectivity port 460 and a plurality of I/O ports 455a-n.

The mode component 410 acts as rotary switch that allows a user to select and implement stored pre-programmed deployment functions of the operating software 435, such as for example, security policy and firewalls, virtual LAN (VLAN), and/or quality of service (QOS) networking. The control component 420 is responsible to execute the necessary function based on the mode component selection made by a user via the configuration component 430. A processor 432 executes operating software 435 that runs the programmed functions of the CNM 310.

The CNM 310 can also be programmed to execute customized network functions when used in conjunction with the configuration component 430. The configuration component 430 is comprised of configurable hardware and software that enables specialized custom port configurations to perform specialized network functions. The configuration component 430 provides an independent interface to the control component 420 to allow fast configuration and secure bootstrapping. For example, the configuration component 430 may include a Bluetooth or other wireless communication hardware module operating a two-way wireless software protocol for establishing two-way communication between the CNM 310 and a remotely located handheld device (not shown), such as a smartphone, a tablet, or a laptop PC. A user using the handheld device can directly query port configuration settings of the I/O ports 455a-n and expansion ports 465a-n and set custom port settings such as for example, port speed, switched port analyzer (SPAN) and VLAN configurations.

The security component 440 includes both hardware and software applications providing one or more security attributes such as, for example, hardware authentication, firewalls, secure boot, signed firmware and deep packet inspection. The security component 440 is responsible for ensuring authentication when the other components of the network module are connected to exterior sources. For example, the security component would provide a proper security authentication to external handheld devices connected or attempting to connect to the configuration module 430. Additionally, the security component monitors I/O ports 455a-n and expansion ports 465a-n to detect any changes at the ports. The security component 440 notifies the control component upon detection of an irregular condition. The control component may then send status messages to a supervising controller, such as enterprise controller 138 or to the operator station 140 through the system connectivity port 460 and network connection 136 of the detected irregular condition.

The expansion component 450 is a hardware Ethernet switch that provides a mechanism to horizontally scale and expand the port connections of the CNM 310. Data and control signals to and from controllers 106 are connected to the expansion component 450 via expansion ports 465a-n and cables 127a-n using a mix of copper or fiber cables, employing wired or wireless Ethernet or serial network protocols. A software defined internal network between the expansion component and expansion component separates data and control connections to a data plane connection 451 and a control plane connection 453. The control plane connection 453 is used to pass firmware updates, configuration data, such as for example port speed, SPAN and VLAN to the expansion component and expansion ports 465a-n. The control plane connection 453 is also used to send status messages from the expansion ports 465a-n to the control component 420 such as, for example, notifications to controller 136 or operator station 140 of the status and configuration of ports 465a-n as well as the operational status of the expansion component 450. Since the data plane connection 451 does not have the burden to also pass control signals between the control component 420 and expansion component 450, data signals travelling on the data plane connection 451 travel uninterrupted at high rates speeds than they would have if data signals were shared with control signals.

The CNM 310 is connected to I/O modules 203 and devices of a control node through a plurality of connectivity ports consisting of I/O ports 455a-n and to the supervisory layers of the DCS via system connectivity port 460. Ports 455a-n and system connectivity port 460 are connected to the control component 420. The system connectivity port 460 provides an "uplink" to the supervisory layers of the DCS via network connection 136 to provide notifications to the DCS of the status and or changes to the control network module 310. This may include for example, cable breaks or reconnects new device connections and disconnections, and any changes in port speed. Additionally, notifications to the DCS may be sent for attempts to connect unknown devices to I/O ports 455a-n as well as port shutdowns due to MAC flapping/loop situations, monitoring port drop rates and unusual traffic rates to a connected I/O module 203 or another connected device. Connections to/from I/O modules 203 are made using cables 126a-n to I/O ports 455a-n using a mix of copper or fiber cables, using wired or wireless Ethernet or serial network protocols based on the type of I/O modules 203 or other devices connected to the control node.

The CNM 310 described above and shown in FIG. 4 can be configured as a single I/O termination assembly (IOTA) module or interconnected with another CNM 310 (not shown) via a backplane of an equipment cabinet or frame to provide an active system IOTA that can easily interconnect to multiple I/O modules 203 and controllers 106 in a DCS control node. Alternately, two network control modules 310 can be connected together using a data and control cabled connection.

The present disclosure uses the decentralized network architecture just described with a data gathering and graphing method that discovers connected devices connected to the Ethernet network and that can provide a graphical representation of the devices connected to the network to a user. The data discovery method of the present disclosure overcomes the limitations and complexities of a central network discovery method and provides network management capabilities at the supervisory and I/O communication levels without impacting communications on the Ethernet network.

The present disclosure uses the following three key components to establish a decentralized network discovery and graphing method for connected devices on an Ethernet network. The first component of the discovery method uses a Link Layer Discovery Protocol (LLDP) with specific vendor custom Type-Length-Values (TLVs) to locate network devices located in any neighboring nodes. The second component builds rich neighbor data with information captured from both the LLDP vendor custom TLV and with local network switch information. The third component uses a process to parse the Ethernet network to subsequently allow the construction of a graphic representation depicting the devices connected to multiple nodes on the Ethernet network.

In the first component, the devices connected to the network 136 use the LLDP to advertise the identity, capabilities, of any neighboring devices on the wired Ethernet local area network based on IEEE 802 technology. A CNM 310 connected to a control node would exchange LLDP packets with a neighboring CNM 310 in another node. The LLDP packets support attribute data used to learn information about the neighboring devices contained in control nodes and connected to the Ethernet network. The attribute data have a defined format known as a Type-Length-Value (TLV). LLDP supported devices can use TLVs to receive and send information to their neighbors. For example, the attribute data may contain the Media Access Control (MAC) address of the sending device, the devices hardware or physical address, and the Internet Protocol (IP) address of a device connected to the network that uses internet protocol for communication. The TLV may also include a device type attribute data, which identifies and represents the current devices connected to the Ethernet network, such as for example the devices that operate at certain port speeds or which may have identifying icons used in representing the devices on the DCS. Other information that may be defined by the TLV may include a network time protocol NTP server IP address, Virtual Local Area Network (VLAN) IDs and node IDs. The VLAN and node IDs are used to identify using a numerical string, a VLAN or a node based on a vendor's definition. The information provided by the LLDP data packets is stored in the CNM 310 as vendor node information and used in the subsequent components of the network discovery method.

In the second component of the network discovery method, a compilation of a neighbor data is made based on information available locally on a network node from two key sources, the incoming LLDP messages and local Ethernet switch information, such as for example, the control component 420 and the expansion component 450 of the CNM 310 shown in FIG. 4. The local Ethernet switch function that allows the passage of data through the local Ethernet switch also stores a MAC table, such as Table 1, containing the MAC address and port number of the Ethernet switches associated with a CNM 310. Data contained in the local switch will be read and used as an initial data structure by the network discovery method.

TABLE 1

| MAC Address | Port Number |
|---|---|
| Aa | 3 |
| Bb | 6 |
| Cc | 1 |
| ... | ... |

Figure 5:
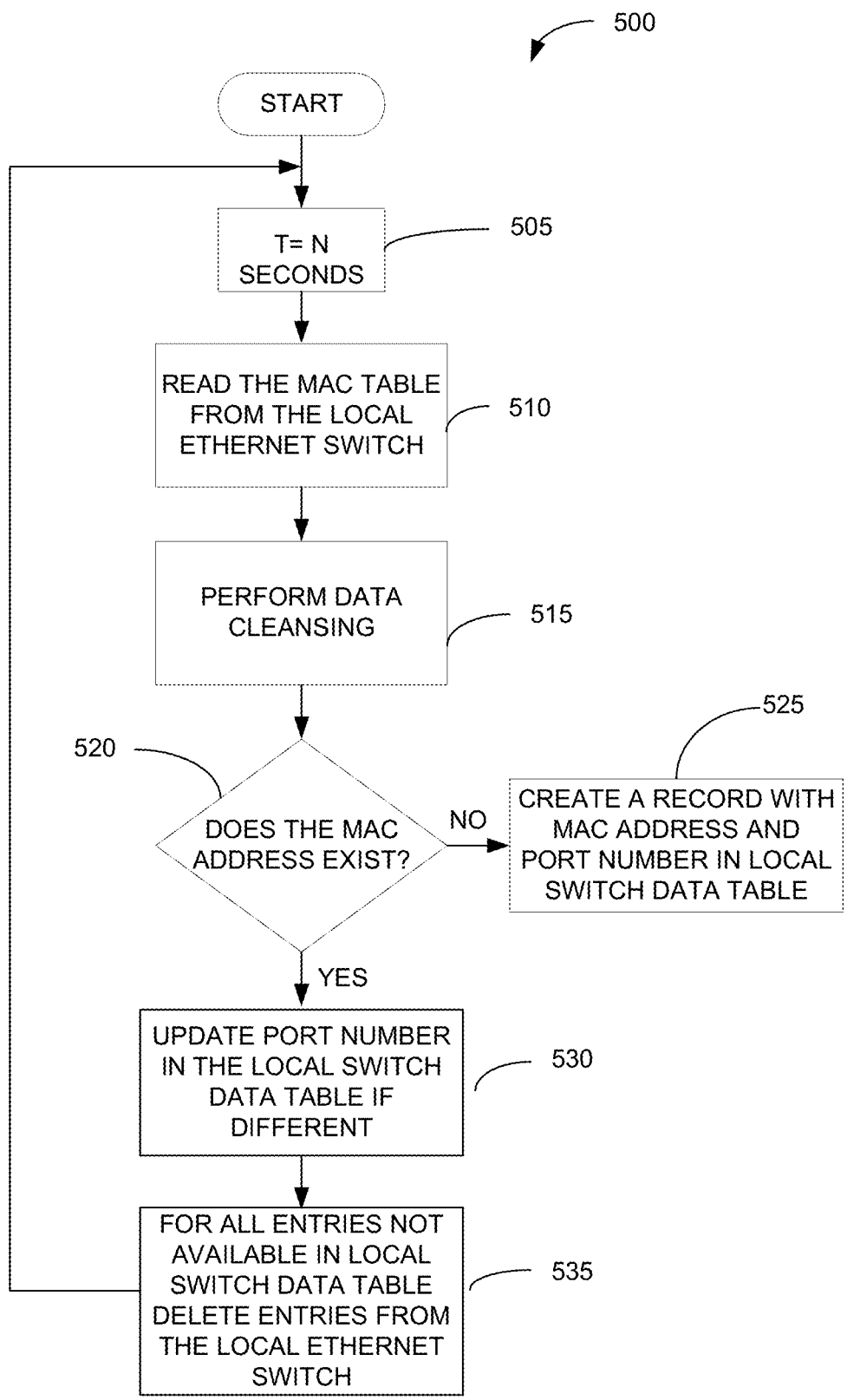
FIG. 5 illustrates an example method for building a switch data table according to the present disclosure.

A method 500 for building a switch data table, such as Table 1 above, is illustrated in FIG. 5. In method 500, for an allotted time interval 505, for example every 60 seconds, the CNM 310 reads the MAC table 510 of a local Ethernet switch. In step 515 the data read from the local Ethernet switch is cleansed to map the MAC address to the local CNM 301 user port numbers and to remove any internal ports. After the cleansing step 515 the MAC addresses are queried in step 520. The query 520 ascertains if the MAC address exists on the network. If the MAC address does not exist, the entries are captured and recorded at step 525 and entered into the local switch data table with MAC address and port number. If an entry exits on the local switch data table, an update 530 is made to the port number if the port numbers are different. For all MAC addresses not available in the local switch data table they are deleted from the local Ethernet switch in step 535.

Using the LLDP information and the local switch data of table, of Table 1, the method builds a neighbor data table, such as Table 2 shown below.

TABLE 2

| MAC Address | Port Number | Device Type | Node ID | IP Address | Firmware |
|---|---|---|---|---|---|
| Aa | 3 | CNM | 41 | 10.0.0.32 | v1.8.9 |
|  | 2 | Other | Abcs | 192.168.0.5 | VersionInfo |
| ... |  |  |  |  |  |

The Table 2 is constructed upon receipt of a LLDP message by the CNM 310. Table 2 includes information for a device, such as for example, its MAC address, the port number, the device type, e.g., if it is a CNM, its IP address and the firmware version loaded in the device.

Figure 6:
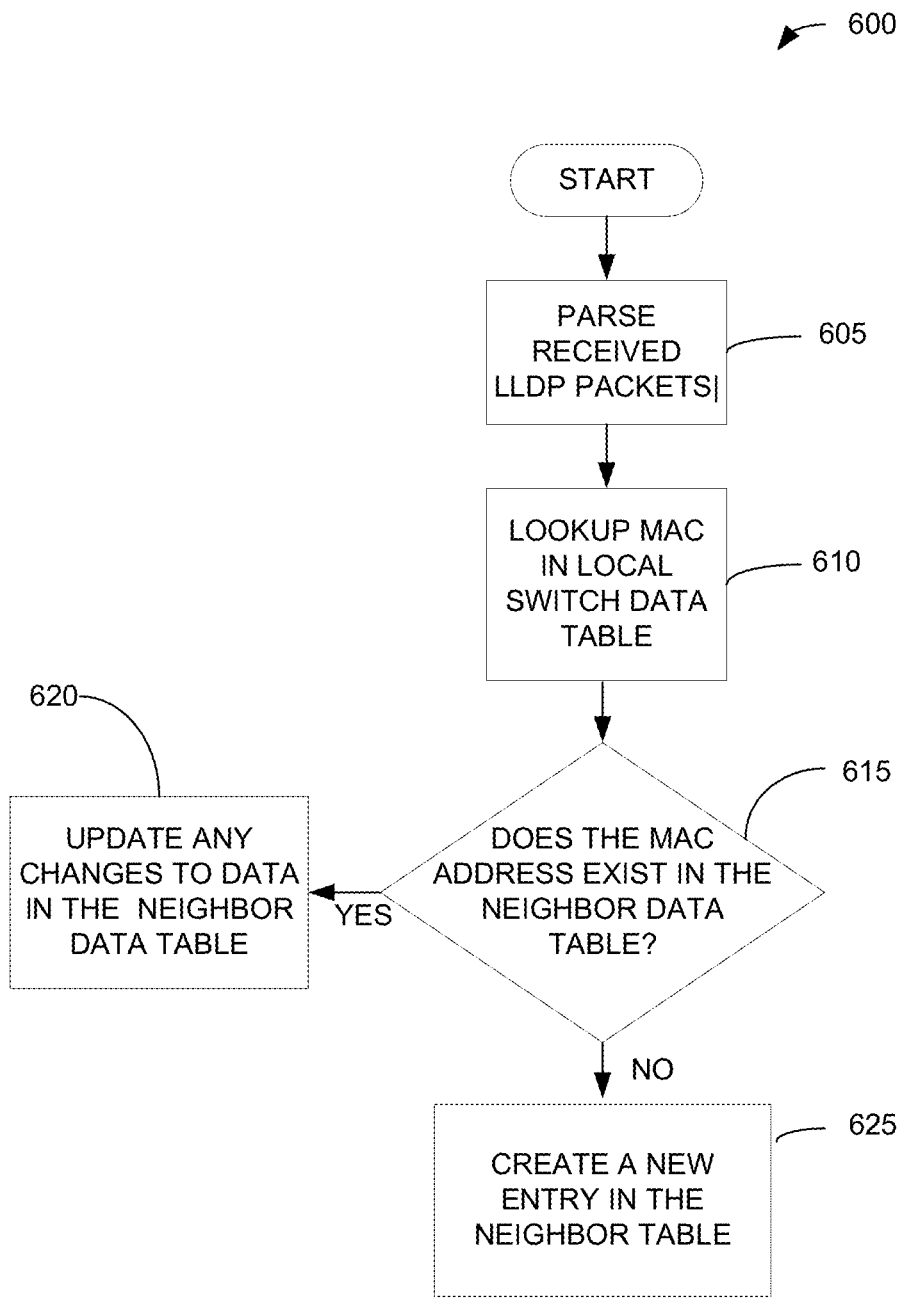
FIG. 6 illustrates an example method for building a neighbor data table according to the present disclosure.
Figure 7:
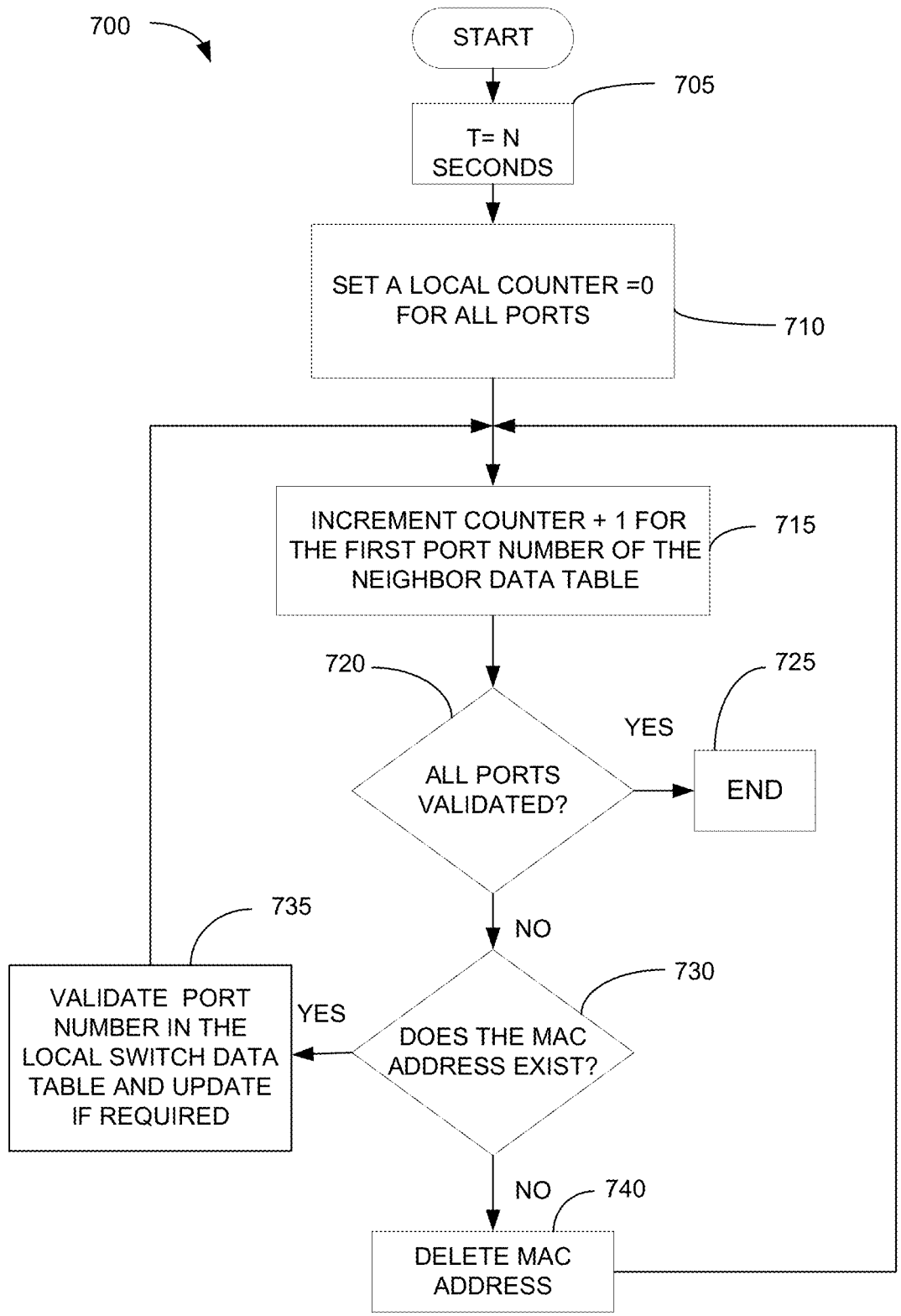
FIG. 7 illustrates an example method for managing a neighbor data table according to the present disclosure.

FIG. 6. shows a block diagram 600 of the method for building a neighbor data table illustrated by Table 2. In the first step 610 data is first parsed from the received LLDP packets. Next in step 610 The MAC address of the device is looked up using the local switch data of Table 1. In step 615 the MAC address of an entry is made into the neighbor data table using the following logic. In step 625, if the entry does not exist, a record is created in the neighbor data table with the device's MAC address and port number. If the MAC address exists in the neighbor data table, then any updates or changes to the data associated to the device are entered into the neighbor data table in step 620.

A secondary neighbors data table is further constructed for use by the third component of the network discovery method of the disclosure. The neighboring device table, Table 3 is shown below.

TABLE 3

| Port Number | Device Type | Neighbor Device(s) |
|---|---|---|
| 1 | CNM | "CNM details" |
| 2 | Other | "MAC addresses of devices" |
| 4 | Other | "Empty" |
| 3 | ... | ... |

FIG. 7 shows a method 700 for managing the neighbor data in Table 2. Method 700 manages the neighbor data table to ensure that the data in Table 2 is correct and valid before using the data to build the neighboring device table of Table 3. This will provide the most up to date information for the graphing application.

In the method 700, periodically once every set period of time, such as for example every 30 seconds, a local counter is set at step 705. The counter is set to start at 0 and increment through all the port numbers contained in Table 3. The counter is incremented in step 715. In step 720 a decision step is made that validates if the device should still exist in the neighbor data Table 2. If all ports have been validated, then the method 700 ends. However, if more ports need to be validated then the program branches to decision step 730 where the MAC address is still available in the network. For example, if the MAC address is not available, the MAC address is deleted in step 740 and the counter in step 710 is incremented to validate the next port. If the MAC address exists, then the MAC address is validated in step 735 to ensure that that the MAC address for the port number is correct. The MAC addresses is validated against the port number entered in the local switch data table. After the port number is validated, the method jumps to step 715, and the counter is incremented to validate the next port in the neighbor data table.

Figure 8:
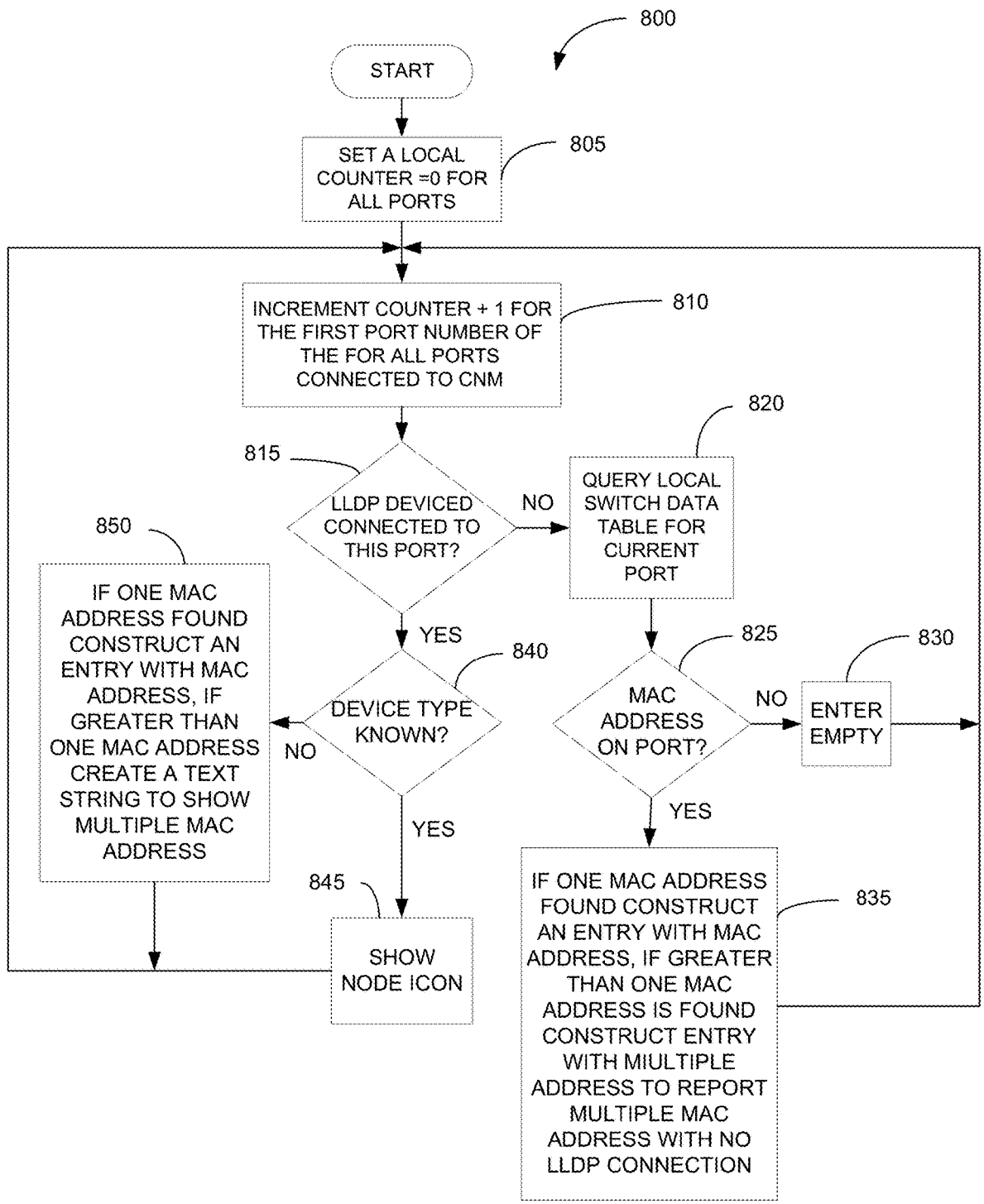
FIG. 8 illustrates an example method for building the neighboring device table according to the present disclosure.

FIG. 8 illustrates a method 800 for building the neighboring device table, shown at Table 3 above. Table 3 is used by the graphic application of the third component of the network discovery method to help build the graphical representation of the devices connected to the Ethernet network.

A counter is set at step 805 to start at 0 and is incremented in step 810 through all the port numbers contained in Table 3 for each port of a CNM 310. In step 815 the port number is examined if an LLDP device is connected on this port. This is done by querying the local switch data from Table 1 in step 820 for the port being examined. If no MAC address is associated with the port, then an "Empty" text designation or label is added to Table 4 in step 830. In step 835, if a single MAC address is encountered, an entry is made to the neighboring device table with the MAC address of the device sending the LLDP data. This is shown in Table, under the Neighbor device(s) column "MAC addresses of devices" would be listed. A single entry signifies an end node with no LLDP capability. If two or more entries are encountered, for example MAC 1, MAC 2 MAC 3, etc. the first 2 or 3 MAC addresses are entered in the neighbor devices column to report several MAC addresses with no LLDP connections.

If an LLDP connected mode is encountered in step 815 and if the device type is known based on a query in step 840, for example a CNM, such as CNM 301 as the neighboring device, an entry is made in Table 3 with this nodes icon. The icon received as a TLV attribute data in the LLDP packet. If the device type, however, is unknown, a MAC address is constructed in step 850 for the unknown device and an entry in the neighboring device table is made with the constructed MAC address. If more than one LLDP device is found connected to a particular single port a data string consisting of, for example, a series of MAC addresses, e.g., MAC 1, MAC 2, MAC 3 are made as entries for the port. After wither step 835 or step 850 the method branches back to the step 810 and the counter incremented to the next port connected to the CNM until all of the ports for a CNM 310 are examined.

Figure 9:
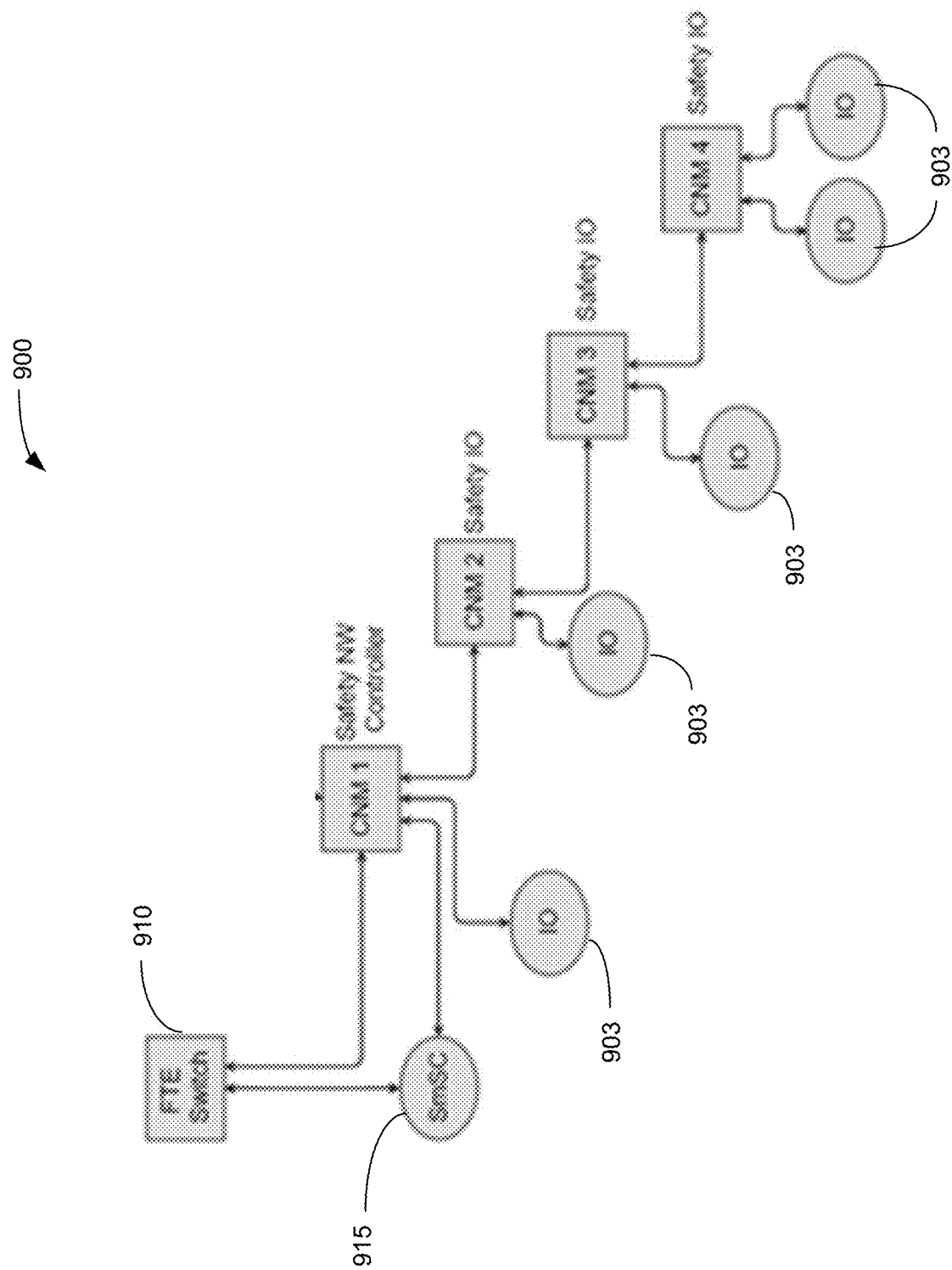
FIG. 9 illustrates an example graphical representation of the Ethernet network developed using the network discovery method of the present disclosure.

FIG. 9 illustrates a graphical representation of the Ethernet network developed using the third key component of the network discovery method of the present disclosure. The third component uses a graphing application that may be loaded in the CNM 310 or executed on the operator's station 140. The graphing application constructs a schematic illustration or graph of the Ethernet network of a node using the neighboring device table of Table 3. The example schematic graph of FIG. 9 illustrates a sample safety network 900 that may be displayed by the graphing application. In the exemplary schematic the Ethernet network displays a plurality of network nodes each network node including a CNM configured to manage safety IO modules 903. CNM 1 acts as the safety network controller for the CNM 2-4.

As the network controller, CNM 1 is connected to a DCS via an FTE switch 910 and to a safety management system controller 915. The switch 910 and controller 915 connect to CNM 1 through supervisory network 136. This graphical representation would be the same network graph that would be seen by a user when the user connects to any one of the CNMs 1-4, in the node. using a portable device connected to the configuration component 430 of CNM 310 in FIG. 4. Alternately the network schematic graph may be displayed at an operator's station 140 The visibility to the different connected nodes of the network enables a user to perform multiple network management activities from any of the CNMs on the network.

Figure 10:
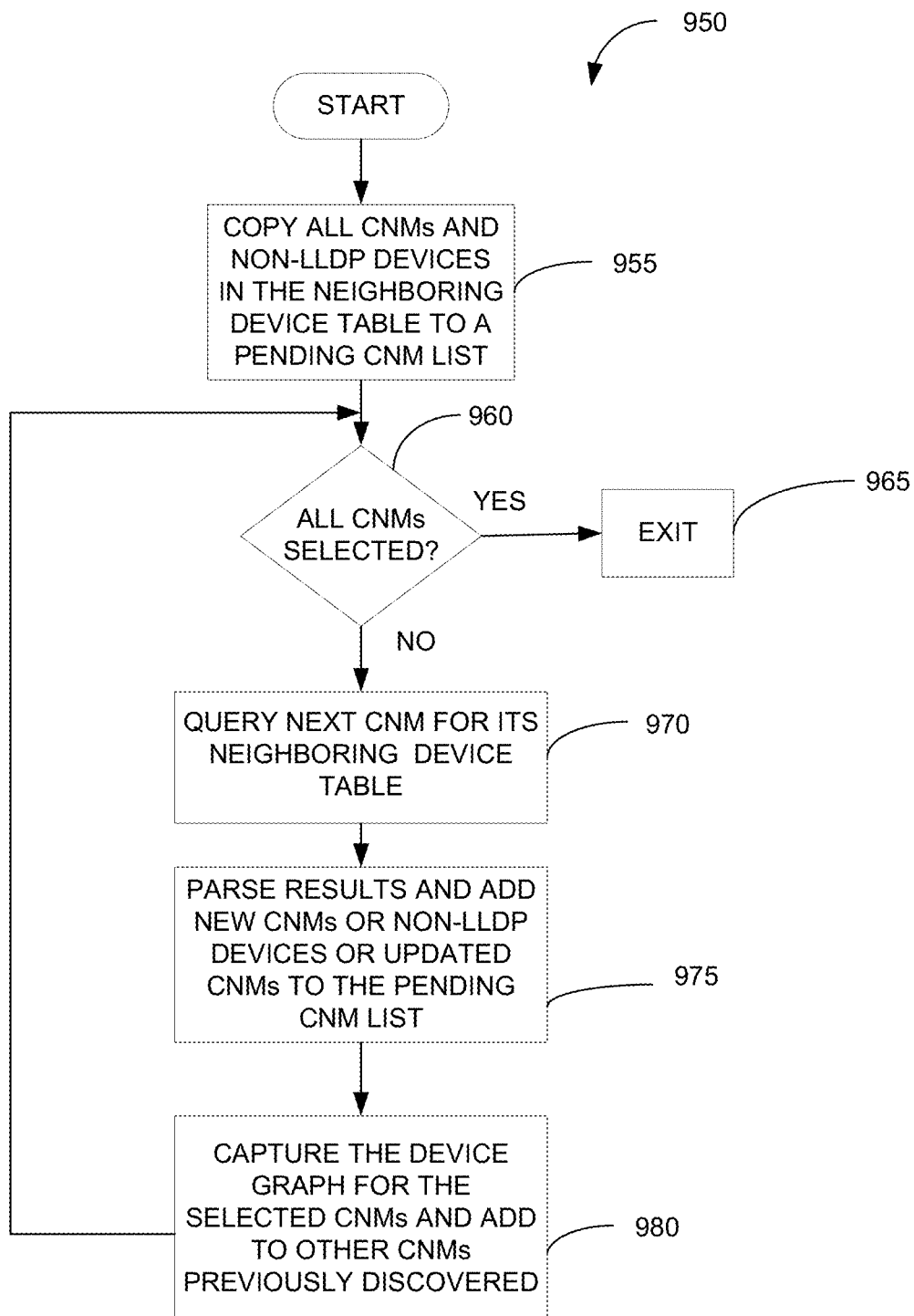
FIG. 10 illustrates a block diagram of the third key component of the network discovery method used by the present disclosure to construct the graphical representation of FIG. 9 according to the present disclosure.

FIG. 10 illustrates a block diagram 950 of the third key component of the network discovery method and used by the present disclosure to construct the graphical schematic. In step 955, every CNM or non-LLDP device entry in the neighboring device table for a first CNM is copied to a pending CNM list. Next in step 960, the method either selects the next CNM on the copied CNM list to process or it exits the loop 965 if no more CNMs or non-LLDP devices are encountered. In step 970 the next CNM in the pending CNM list is queried for its own neighboring device table. The information contained in the neighboring device table is parsed and any new or updated CNMs or any non-LLDP devices contained in the queried CNMs neighboring device table are added to the pending CNM list. In step 980 the graphical application uses the pending CNM list to capture the devices previously discovered to the other CNMs. The method branches back to step 960 to process the next CNM entry on the neighboring device table until all entries in the table have been processed. When complete, the graphics application constructs the schematic representation of the network as shown in FIG. 9.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for identifying and displaying a graphical representation of the network devices connected to a communication network comprising:
    capturing using a discovery protocol attribute data of the network devices connected to the communication network;
    compiling a neighbor data table for the network devices connected on the communication network using the attribute data captured by the discovery protocol and information from a communication network switch; and
    using the neighbor data table to develop a neighboring device table listing the network devices connected to the communication network,
    wherein a graphing application uses the neighboring device table to construct a graphical representation of the communication network on a display.

2. The method of claim 1, wherein the step of capturing uses a link layer discovery protocol (LLDP) to capture the attribute data of the network devices.

3. The method of claim 2, wherein the method further includes:
    constructing a switch data table identifying a media access control (MAC) address for each port of the communication network switch.

4. The method of claim 3, wherein the step of compiling the neighbor data table uses the attribute data captured by the LLDP and the identified MAC addresses and ports from the switch data table.

5. The method of claim 4, wherein the neighbor data table is used to create an initial list of network devices connected to each other on the communication network.

6. The method of claim 5 wherein the neighbor data table is used to build the neighboring device table containing the MAC addresses, the port numbers, the network device types, and the network connections to neighboring network devices.

7. The method of claim 6 wherein the method further includes:
    managing the neighboring device table to validate the port numbers and the MAC addresses of the neighboring device table.

8. The method of claim 7, wherein the graphing application uses the neighboring device table to construct the graphical representation of the communication network and the network devices connected to the communication network on the display of a display device.

9. An apparatus for discovering and displaying a graphical representation of a plurality of network devices connected to a communication network on a display device, the apparatus comprising:
    a control network module communicatively coupled to the plurality of network devices;
    a first component executed by a control component of the control network module arranged to capture attribute data of the plurality of network devices;
    a second component executed by the control component of the control network module arranged to construct a switch data table identifying a media access control (MAC) address for each port of a communication network switch associated with each of the plurality of network devices and using the attribute data and the switch data table to construct a neighbor data table for the plurality of network devices connected to the communication network; and
    a third component executed by the control component of the control network module arranged to use the neighbor data table to construct a neighboring device table that is arranged to build the graphical representation of the communication network on the display device.

10. The apparatus of claim 8, wherein the each of the plurality of network devices uses a Link Layer Discovery Protocol (LLDP) to exchange communication packets with the control network module that contain the attribute data of each network device connected to the control network module.

11. The apparatus of claim 10, wherein the attribute data comprises at least the MAC address of the sending network device, the network device type, the network device physical address and the Internet Protocol (IP) address of the network device.

12. The apparatus of claim 11, wherein the second component uses the attribute data received by the control network module from each network device and the MAC address and port number of the communication network switch associated with the control network module to construct the switch data table.

13. The apparatus of claim 12, wherein the second component ascertains that the MAC addresses exists on the communication network.

14. The apparatus of claim 12, wherein the second component builds a neighbor data table for the plurality of network devices connected to the communication network using the attribute data captured by the LLDP and the port numbers from the switch data table.

15. The apparatus of claim 14, wherein the second component uses the neighbor data table to build a neighboring device table for each MAC address of the communication network, containing the port number, the network device type, and the network connections to neighboring network devices.

16. The apparatus of claim 15, wherein the third component manages the neighboring device table to validate the port numbers and the MAC addresses of the neighboring device table.

17. The apparatus of claim 16, wherein the apparatus further includes:
    an operator station operationally coupled to a display device; and
    the third component includes a graphical application arranged to receive the neighboring device table and using the neighboring device table to develop the graphical representation of the communication network and the network devices connected in the communication network to the operator station display device.

18. The apparatus of claim 17, wherein the graphical application is executed by the control component of the control network module.

19. The apparatus of claim 16, wherein the graphical application is executed at the operator station.

20. A decentralized method for discovering and graphically representing network devices connected in a plurality of network nodes in a communication network, each node of the plurality of network nodes including a control network module, the method comprising:
    capturing by the control network module of each network node using a link layer discovery protocol (LLDP) attribute data of the network devices connected to the network node and associated with the control network module;
    constructing a switch data table identifying a media access control (MAC) address for each port of a communication network switch associated with each network device and control network module for each network node;

compiling by each control network module of each network node a neighbor data table for each network device connected to each network node using the attribute data captured by the LLDP and the switch data table;

using the neighbor data table to develop a neighboring device table containing the network devices connected to each control network module of each network node; and requesting by at least one control network module using its own list of neighboring device table the neighboring device table associated with the control network module of another of the plurality of network nodes; and updating the neighboring device table with the network devices of the another network node, wherein the requesting control network module uses a graphing application and the neighboring device table to construct a graphical representation of the plurality of network nodes and the network devices connected to the network nodes on a display.

* * * * *